(12) United States Patent
Balasubramanian et al.

(10) Patent No.: US 11,991,606 B2
(45) Date of Patent: May 21, 2024

(54) METHOD AND APPARATUS FOR HYBRID VEHICLE TO PEDESTRIAN SYSTEM

(71) Applicant: QUALCOMM Incorporated, San Diego, CA (US)

(72) Inventors: Anantharaman Balasubramanian, San Diego, CA (US); Sudhir Kumar Baghel, Hillsborough, NJ (US); Shailesh Patil, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/918,714

(22) Filed: Jul. 1, 2020

(65) Prior Publication Data

US 2021/0006955 A1    Jan. 7, 2021

Related U.S. Application Data

(60) Provisional application No. 62/869,854, filed on Jul. 2, 2019.

(51) Int. Cl.
*H04W 4/40* (2018.01)
*G08G 1/16* (2006.01)
*H04W 4/02* (2018.01)
*H04W 4/06* (2009.01)
*H04W 8/26* (2009.01)
(Continued)

(52) U.S. Cl.
CPC ............. *H04W 4/40* (2018.02); *G08G 1/166* (2013.01); *H04W 4/025* (2013.01); *H04W 4/06* (2013.01); *H04W 8/26* (2013.01); *H04W 68/005* (2013.01); *H04W 92/18* (2013.01)

(58) Field of Classification Search
CPC ..... H04W 4/40; H04W 4/025; H04W 68/005; H04W 8/26; H04W 4/06; H04W 92/18; G08G 1/166; G08G 1/16
See application file for complete search history.

(56) References Cited

U.S. PATENT DOCUMENTS

| 2009/0115638 | A1* | 5/2009 | Shankwitz | ............. | G08G 1/161 |
| | | | | | 340/988 |
| 2014/0045556 | A1* | 2/2014 | Subramanian | ........ | B61L 25/025 |
| | | | | | 455/574 |
| 2017/0273053 | A1* | 9/2017 | Ryu | ...................... | H04W 68/02 |

(Continued)

FOREIGN PATENT DOCUMENTS

| CN | 108702786 A | 10/2018 |
| CN | 109891936 A | 6/2019 |

(Continued)

OTHER PUBLICATIONS

International Search Report and Written Opinion—PCT/US2020/040684—ISA/EPO dated Sep. 14, 2020.

*Primary Examiner* — Wayne H Cai
(74) *Attorney, Agent, or Firm* — Patterson & Sheridan LLP

(57) ABSTRACT

Certain aspects of the present disclosure generally relate to wireless communications and, more particularly, to methods and apparatus for warning pedestrians, for example, of potential collisions with vehicles. The techniques may be considered a hybrid approach to reaching a pedestrian, in that it may employ a combination of interfaces (e.g., the radio interface between the pedestrian UE and the radio access network as well as a sidelink interface between the pedestrian UE and vehicle UE).

20 Claims, 12 Drawing Sheets

(51) Int. Cl.
*H04W 68/00* (2009.01)
*H04W 92/18* (2009.01)

(56) References Cited

U.S. PATENT DOCUMENTS

| | | | | |
|---|---|---|---|---|
| 2017/0372612 A1* | 12/2017 | Bai | .................. | G08G 1/161 |
| 2018/0124771 A1 | 5/2018 | Mok et al. | | |
| 2019/0020986 A1* | 1/2019 | Lee | .................. | H04W 4/44 |
| 2019/0028897 A1* | 1/2019 | Ying | .................. | H04W 12/75 |
| 2019/0103010 A1* | 4/2019 | Seto | .................. | G08B 25/016 |
| 2019/0200170 A1* | 6/2019 | Li | .................. | H04W 8/265 |
| 2019/0387393 A1* | 12/2019 | Xu | .................. | H04W 60/005 |
| 2020/0204952 A1* | 6/2020 | Sorrentino | .............. | H04W 4/44 |

FOREIGN PATENT DOCUMENTS

| | | | |
|---|---|---|---|
| KR | 20130068159 A | * | 6/2013 |
| KR | 20130068159 A | | 6/2013 |
| WO | 2015054489 A1 | | 4/2015 |
| WO | 2019071089 A1 | | 4/2019 |

* cited by examiner

METHOD AND APPARATUS FOR HYBRID VEHICLE TO PEDESTRIAN SYSTEM

PRIORITY CLAIM(S)

This application claims priority to and the benefit of U.S. Provisional Application No. 62/869,854, filed on Jul. 2, 2019, which is expressly incorporated by reference in its entirety as if fully set forth below and for all applicable purposes.

FIELD OF THE DISCLOSURE

Certain aspects of the present disclosure generally relate to wireless communications and, more particularly, to methods and apparatus for warning pedestrians, for example, of potential collisions with vehicles.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation. Vehicle to everything communications seek to enable vehicles to communicate with one another to provide a host of services, including vehicle to vehicle communications (V2V), vehicle to infrastructure (V2I) communications, vehicle to grid (V2G) communications and vehicle to people (V2P) communications.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communications by a user equipment (UE). The method generally includes determining the UE is in mode of interest, sending, in response to the determination, a request for the UE to be assigned an identity (ID) different than an original ID of the UE, receiving the assigned ID in response to the request, and broadcasting a packet including at least the assigned ID and information regarding a location of the UE.

Certain aspects provide a method for wireless communications by a network entity. The method generally includes receiving, from a first user equipment (UE) associated with a pedestrian, a request for the first UE to be assigned an identity (ID) different than an original ID of the UE, forwarding the request to a server, receiving, from the server, the assigned ID in response to the request, and forwarding the assigned ID to the first UE.

Certain aspects provide a method for communications by a server. The method generally includes receiving, from a base station, a request from a first user equipment (UE) associated with a pedestrian for the first UE to be assigned an identity (ID) different than an original ID of the first UE, generating the assigned ID based on a mapping of the original ID, forwarding, via the base station, a response to the first UE including the assigned ID to the first UE, receiving, from a second UE associated with a vehicle, a message including the assigned ID and indicating a potential collision between the vehicle and the first UE, and sending, via the base station, a paging request for the first UE, the paging request indicating the original ID of the first UE and the potential collision.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
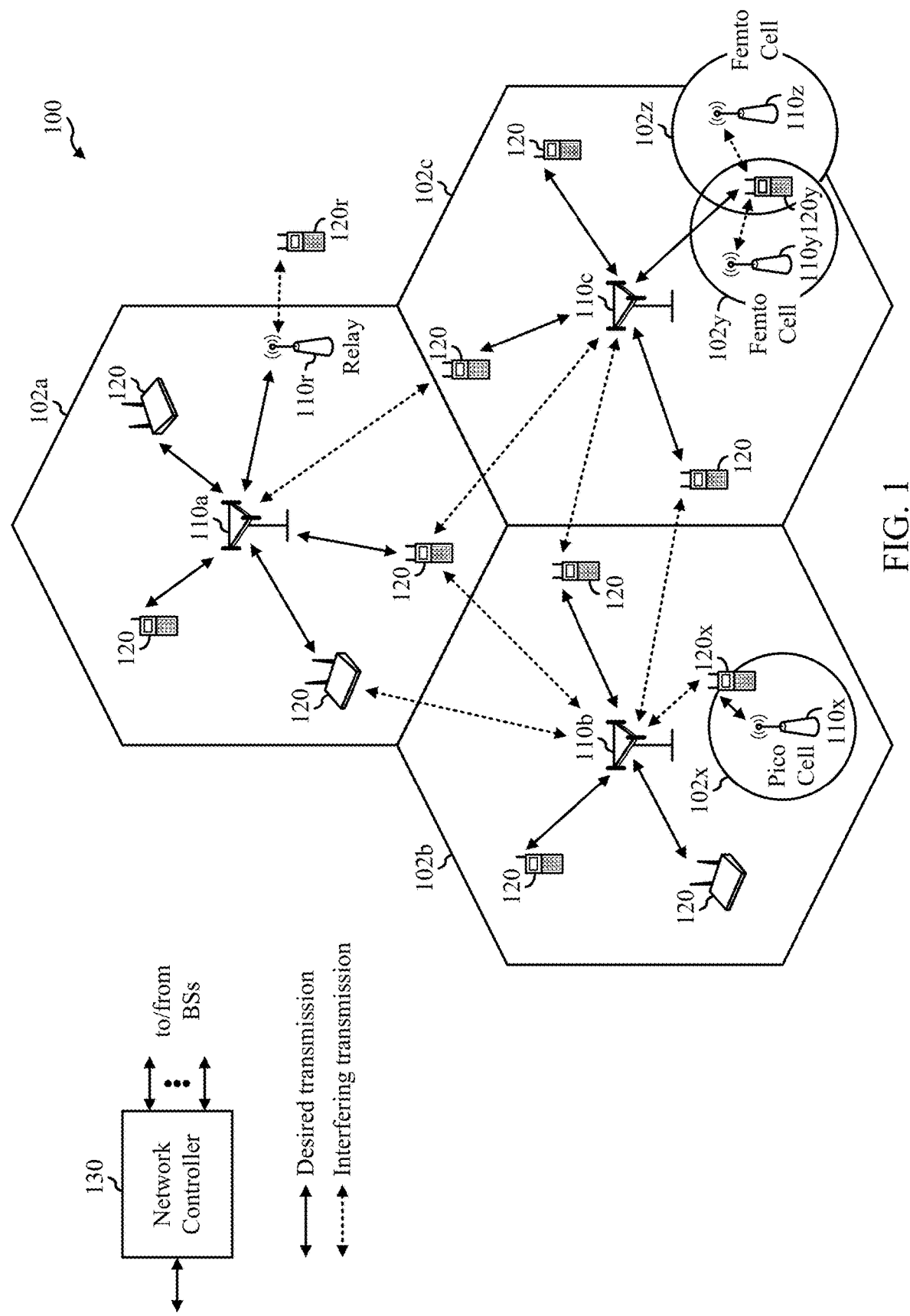
FIG. 1 is a block diagram conceptually illustrating an example telecommunications system, in accordance with certain aspects of the present disclosure.

Certain aspects of the present disclosure generally relate to wireless communications and, more particularly, to methods and apparatus for warning pedestrians, for example, of potential collisions with vehicles. The techniques may be considered a hybrid approach to reaching a pedestrian, in that it may employ a combination of interfaces (e.g., the radio interface between the pedestrian UE and the radio access network as well as a sidelink interface between the pedestrian UE and vehicle UE).

NR may support various wireless communication services, such as Enhanced mobile broadband (eMBB) targeting wide bandwidth (e.g. 80 MHz beyond), millimeter wave (mmW) targeting high carrier frequency (e.g. 27 GHz or beyond), massive MTC (mMTC) targeting non-backward compatible MTC techniques, and/or mission critical targeting ultra reliable low latency communications (URLLC). These services may include latency and reliability requirements. These services may also have different transmission time intervals (TTI) to meet respective quality of service (QoS) requirements. In addition, these services may co-exist in the same subframe.

The following description provides examples, and is not limiting the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless communication network 100 in which aspects of the present disclosure may be performed. For example, base stations 110 in the network may communicate with vehicle UEs (V-UEs), pedestrian UEs (P-UEs), and/or servers, in order to carry out the techniques presented herein.

The wireless network 100 may be a new radio (NR) or 5G network. As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and gNB, Node B, 5G NB, AP, NR BS, NR BS, or TRP may be interchangeable. In some examples, a cell may not necessarily be stationary, and the geographic area of the cell may move according to the location of a mobile BS. In some examples, the base stations may be interconnected to one another and/or to one or more other BSs or network nodes (not shown) in the wireless communication network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC- FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a cyclic prefix (CP) on the uplink and downlink and include support for half-duplex operation using time division duplexing (TDD). A single component carrier (CC) bandwidth of 100 MHz may be supported. NR resource blocks may span 12 subcarriers with a subcarrier bandwidth of 75 kHz over a 0.1 ms duration. Each radio frame may consist of 2 half frames, each half frame consisting of 5 subframes, with a length of 10 ms. Consequently, each subframe may have a length of 1 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such central units (CUs) and/or distributed units (DUs).

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time—frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., gNB, 5G Node B, Node B, transmission reception point (TRP), access point (AP)) may correspond to one or multiple BSs. NR cells can be configured as access cell (ACells) or data only cells (DCells). For example, the RAN (e.g., a CU or DU) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
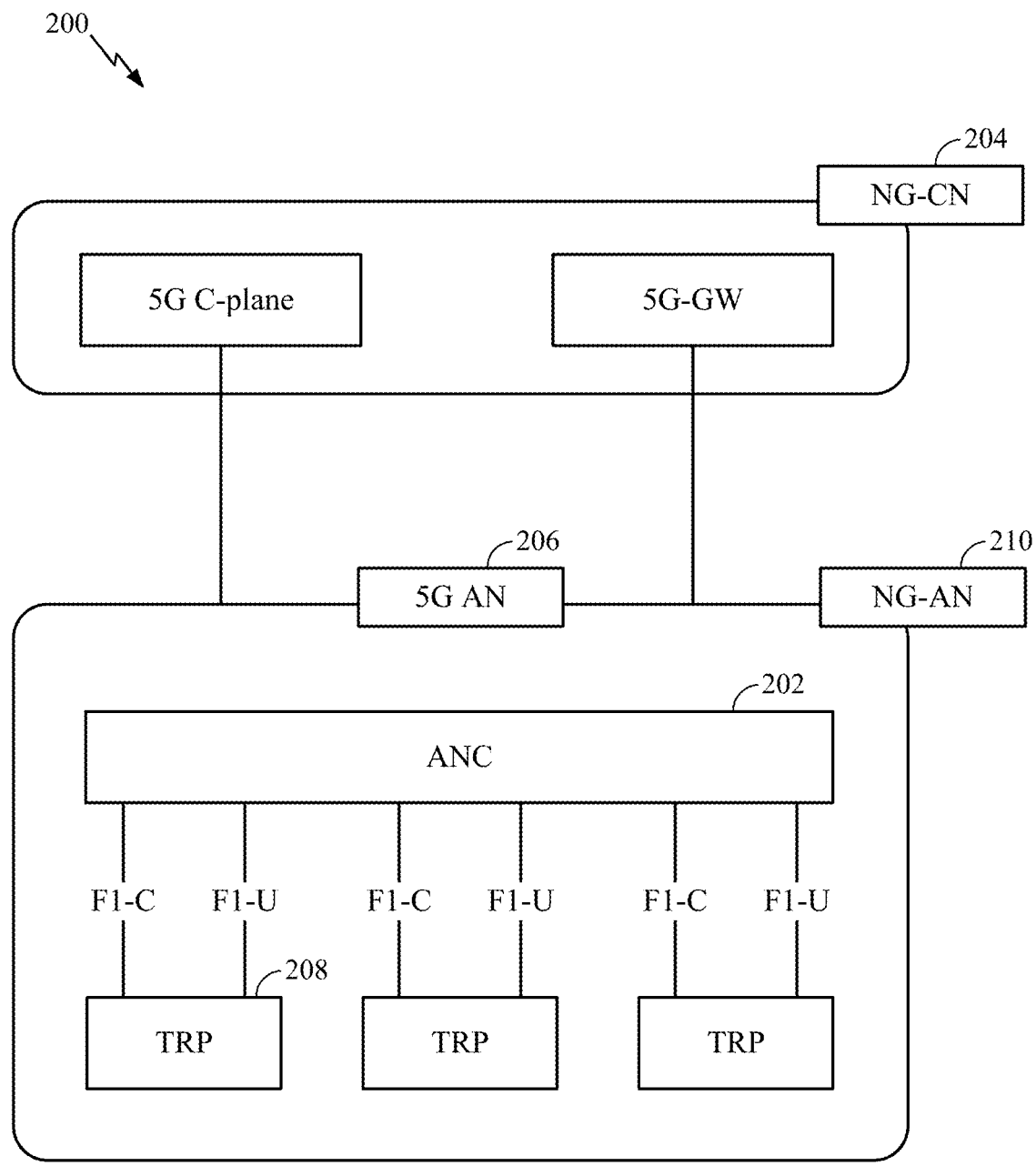
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The logical architecture of the RAN 200 may be used to illustrate fronthaul definition. The logical architecture of the RAN 200 may support fronthauling solutions across different deployment types. For example, the logical architecture of the RAN 200 may be based on transmit network capabilities (e.g., bandwidth, latency, and/or jitter).

The logical architecture of the RAN 200 may share features and/or components with LTE. The next generation AN (NG-AN) 210 may support dual connectivity with NR. The NG-AN 210 may share a common fronthaul for LTE and NR.

The logical architecture of the RAN 200 may enable cooperation between and among TRPs 208. For example, cooperation may be preset within a TRP and/or across TRPs via the ANC 202. There may be no inter-TRP interface.

Logical architecture of the RAN 200 may have a dynamic configuration of split logical functions. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively).

Figure 3:
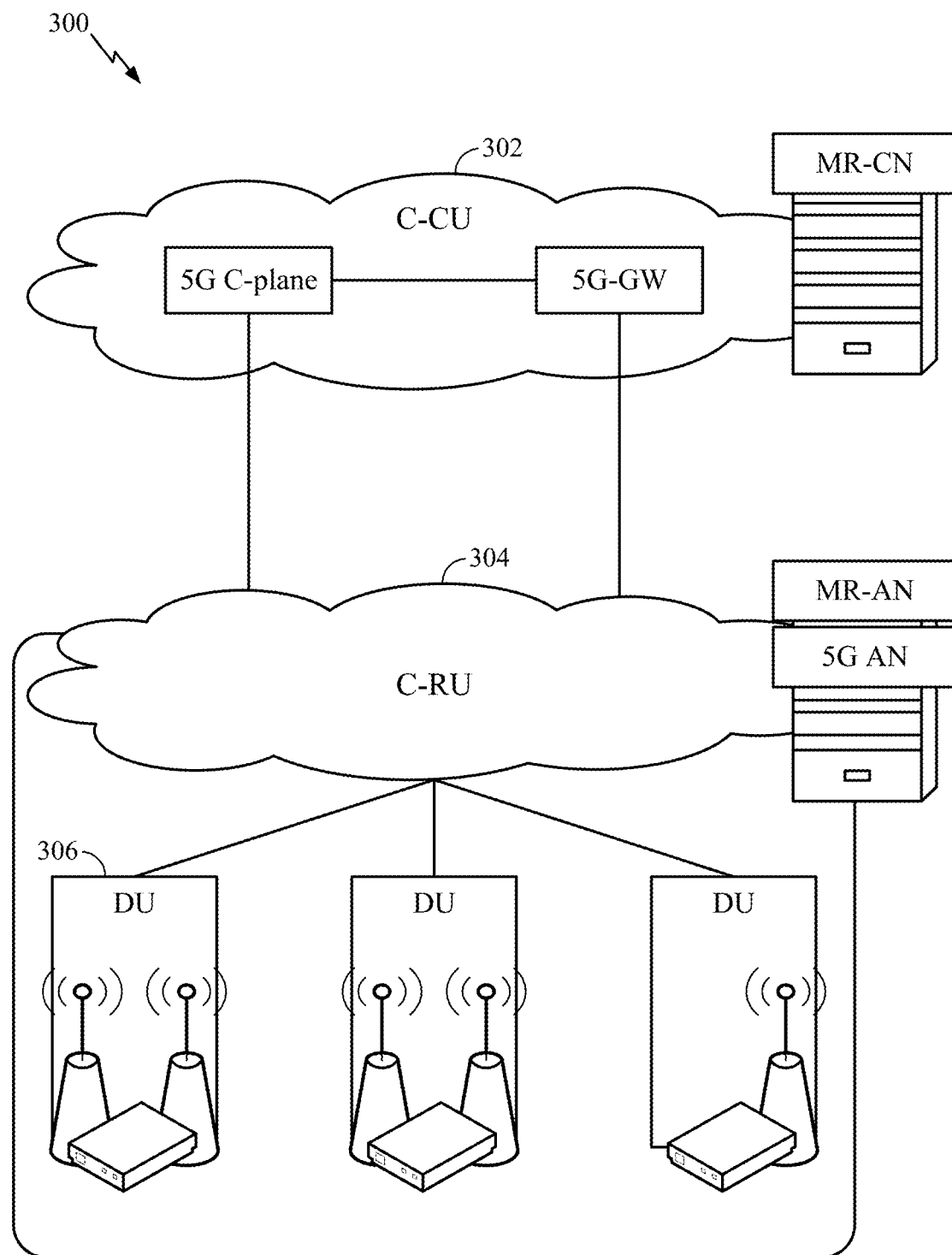
FIG. 3 is a diagram illustrating an example physical architecture of a distributed RAN, in accordance with certain aspects of the present disclosure.

FIG. 3 illustrates an example physical architecture 300 of a distributed RAN, according to aspects of the present disclosure. A centralized core network unit (C-CU) 302 may host core network functions. The C-CU 302 may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
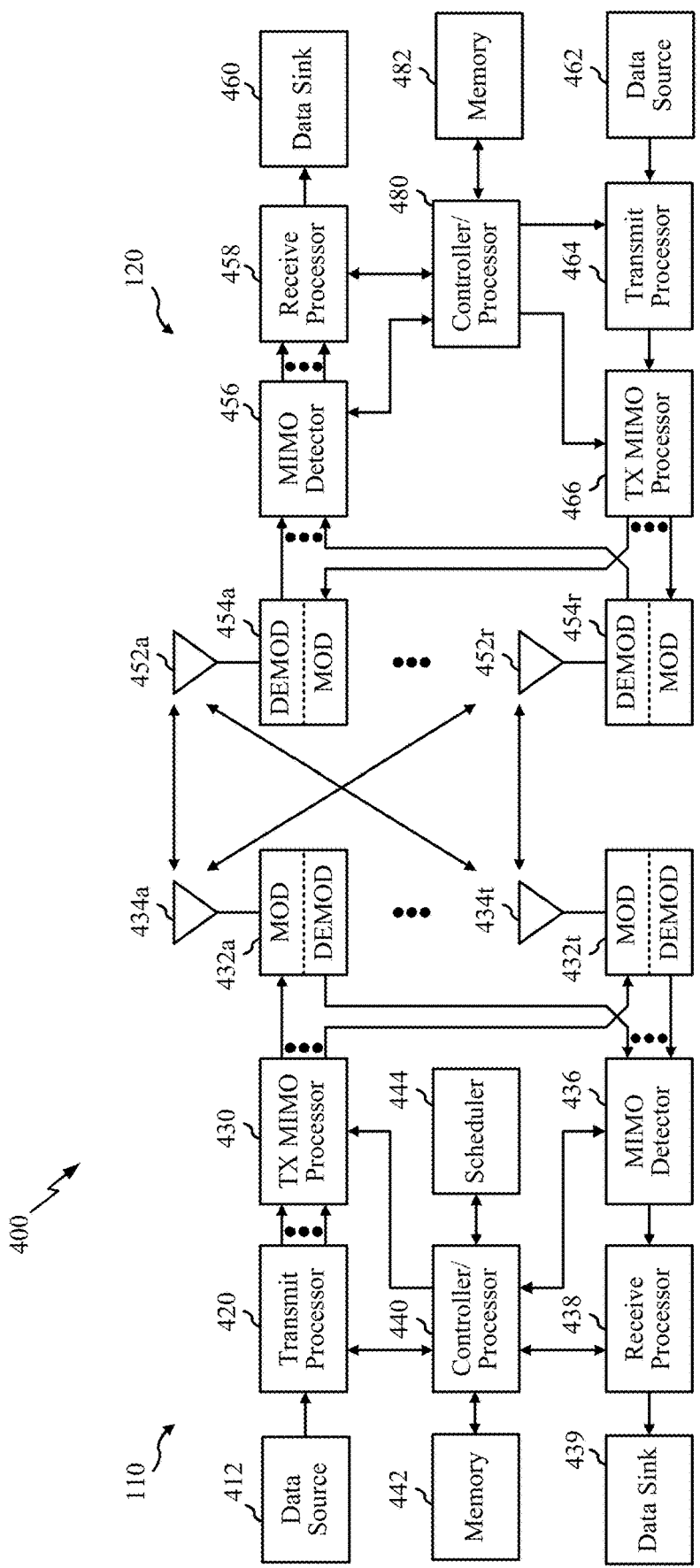
FIG. 4 is a block diagram conceptually illustrating a design of an example base station (BS) and user equipment (UE), in accordance with certain aspects of the present disclosure.

FIG. 4 illustrates example components of the BS 110 and UE 120 illustrated in FIG. 1, which may be used to implement aspects of the present disclosure. The BS may include a TRP and may be referred to as a Master eNB (MeNB) (e.g., Master BS, primary BS). Master BS and the Secondary BS may be geographically co-located.

FIG. 4 shows a block diagram of a design of a BS 110 and a UE 120, which may be one of the BSs and one of the UEs in FIG. 1. For a restricted association scenario, the BS 110 may be the macro BS 110c in FIG. 1, and the UE 120 may be the UE 120y. The BS 110 may also be a BS of some other type. The BS 110 may be equipped with antennas 434a through 434t, and the UE 120 may be equipped with antennas 452a through 452r.

At the BS 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH)) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The memories 442 and 482 may store data and program codes for the BS 110 and the UE 120, respectively. A scheduler 444 may schedule UEs for data transmission on the downlink and/or uplink.

Figure 5:
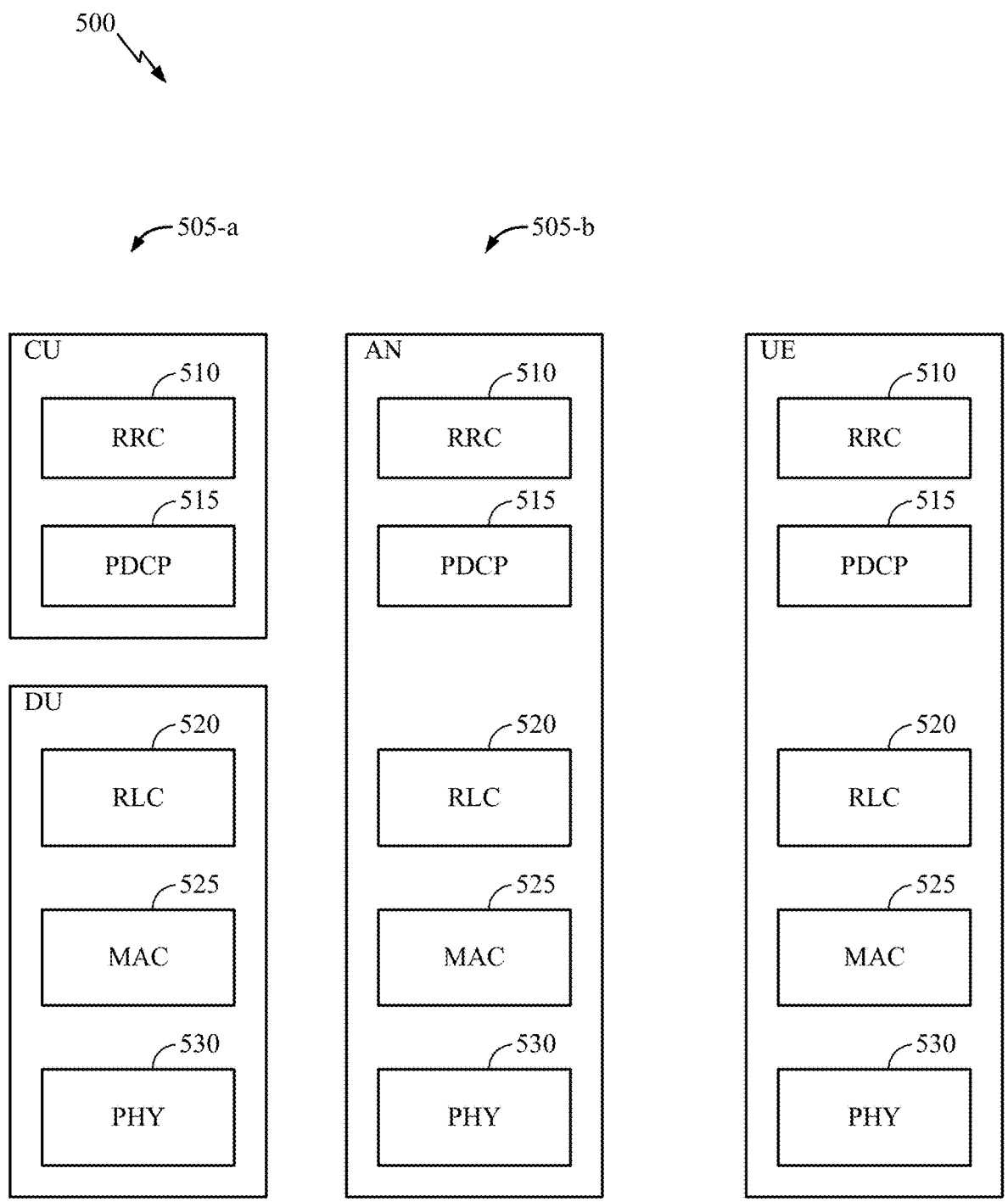
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system. Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., one of TRPs 208 in FIG. 2, which may be implemented as a DU). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-*b* may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
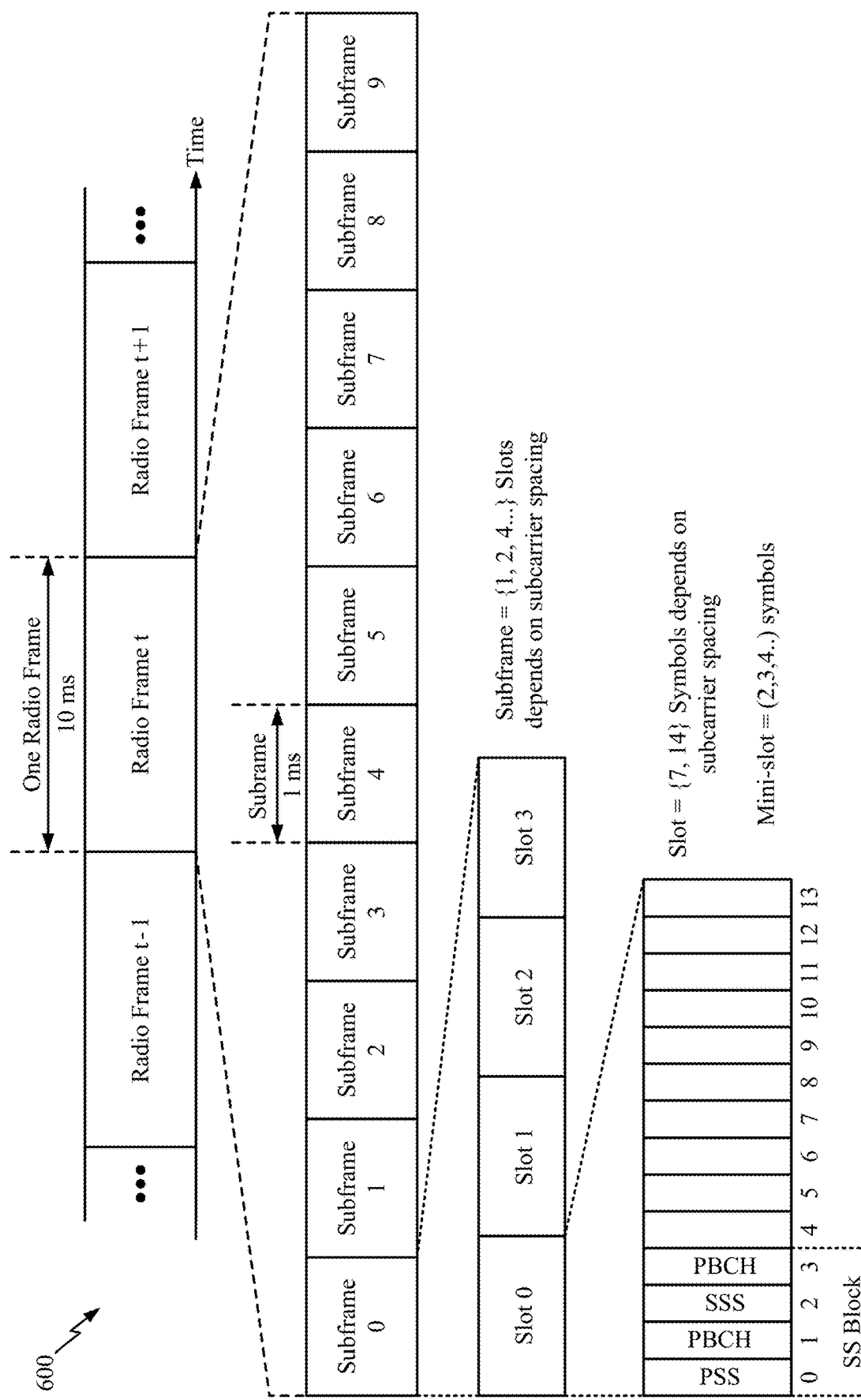
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes.

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

LTE vehicle-to-everything (LTE-V2X) has been developed as a technology to address vehicular wireless communications to enhance road safety and the driving experience.

Figure 8:
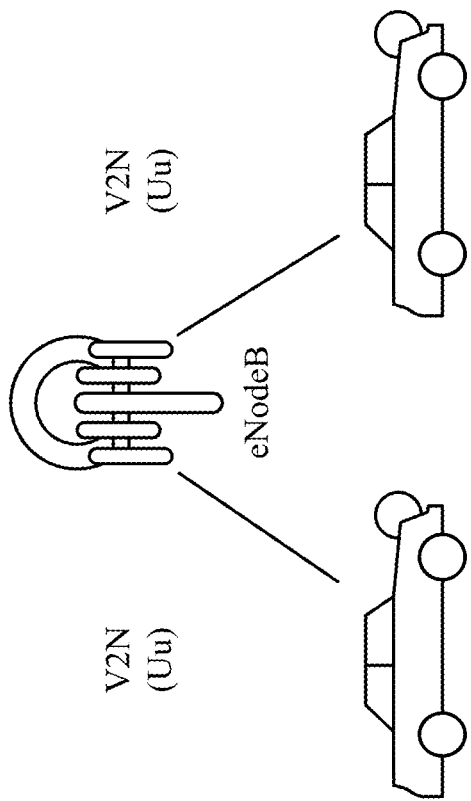
FIGS. 7 and 8 illustrate vehicle to everything (V2X) communication systems, in accordance with certain aspects of the present disclosure.
Figure 7:
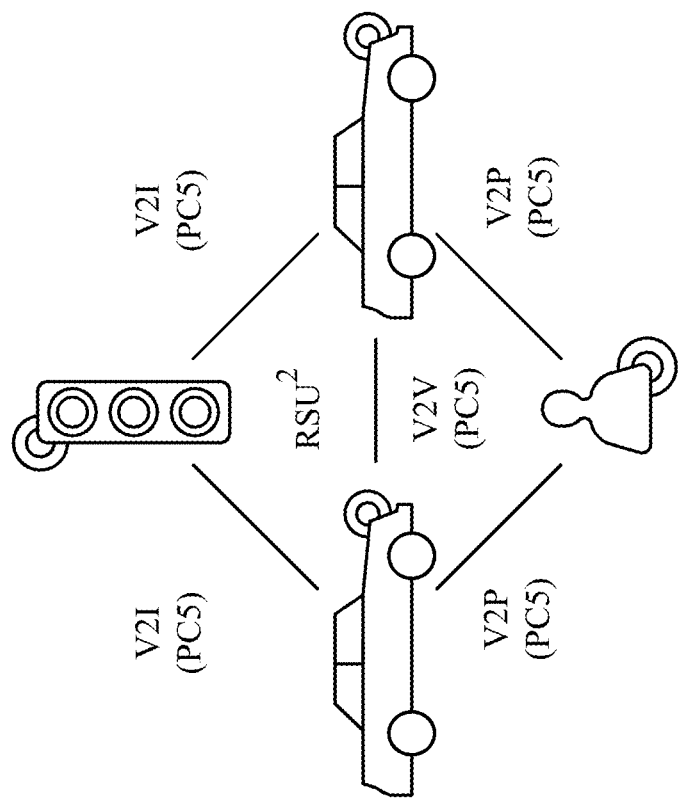

Referring to FIG. 7, a V2X system is illustrated with two vehicles. The V2X system, provided in FIGS. 7 and 8 provides two complementary transmission modes. A first transmission mode involves direct communications between participants in the local area. Such communications are illustrated in FIG. 7. A second transmission mode involves network communications through a network as illustrated in FIG. 8.

Referring to FIG. 7, the first transmission mode allows for direct communication between different participants in a given geographic location. As illustrated, a vehicle can have a communication with an individual (V2P) through a PC5 interface. Communications between a vehicle and another vehicle (V2V) may also occur through a PC5 interface. In a like manner, communication may occur from a vehicle to other highway components, such as a signal (V2I) through a PC5 interface. In each embodiment illustrated, two-way communication can take place between elements, therefore each element may be a transmitter and a receiver of information. In the configuration provided, the first transmission mode is a self-managed system and no network assistance is provided. Such transmission modes provide for reduced cost and increased reliability as network service interruptions do not occur during handover operations for moving vehicles.

Resource assignments do not need coordination between operators and subscription to a network is not necessary, therefore there is reduced complexity for such self-managed systems.

The V2X system is configured to work in a 5.9 GHz spectrum, thus any vehicle with an equipped system may access this common frequency and share information. Such harmonized/common spectrum operations allows for safe operation. V2X operations may also co-exist with 802.11p operations by being placed on different channels, thus existing 802.11p operations will not be disturbed by the introduction of V2X systems. In one non-limiting embodiment, the V2X system may be operated in a 10 MHz band that describes/contains basic safety services. In other non-limiting embodiments, the V2X system may be operated over a wider frequency band of 70 MHz to support advanced safety services in addition to basic safety services described above.

Referring to FIG. 8, a second of two complementary transmission modes is illustrated. In the illustrated embodiment, a vehicle may communicate to another vehicle through network communications. These network communications may occur through discrete nodes, such as eNodeB (or gNodeB), that send and receive information between vehicles. The network communications may be used, for example, for long range communications between vehicles, such as noting the presence of an accident approximately 1 mile ahead. Other types of communication may be sent by the node to vehicles, such as traffic flow conditions, road hazard warnings, environmental/weather reports, service station availability and other like data. Data can be obtained from cloud-based sharing services.

For network communications, residential service units (RSUs) may be utilized as well as 4G/5G small cell communication technologies to benefit in more highly covered areas to allow real time information to be shared among V2X users. As the number of RSUs diminishes, the V2X systems may rely more on small cell communications, as necessary.

In either of the two complementary transmission modes, higher layers may be leveraged to tune congestion control parameters. In high density vehicle deployment areas, using higher layers for such functions provides an enhanced performance on lower layers due to congestion control for PHY/MAC.

The vehicle systems that use V2X technologies have significant advantages over 802.11p technologies. Conventional 802.11p technologies have limited scaling capabilities and access control can be problematic. In V2X technologies, two vehicles apart from one another may use the same resource without incident as there are no denied access requests. V2X technologies also have advantages over 802.11p technologies as these V2X technologies are designed to meet latency requirements, even for moving vehicles, thus allowing for scheduling and access to resources in a timely manner.

Example Hybrid Uu/PC5 Based V2P System

Certain aspects of the present disclosure generally relate to wireless communications and, more particularly, to methods and apparatus for warning pedestrians, for example, of potential collisions with vehicles.

Figure 9:
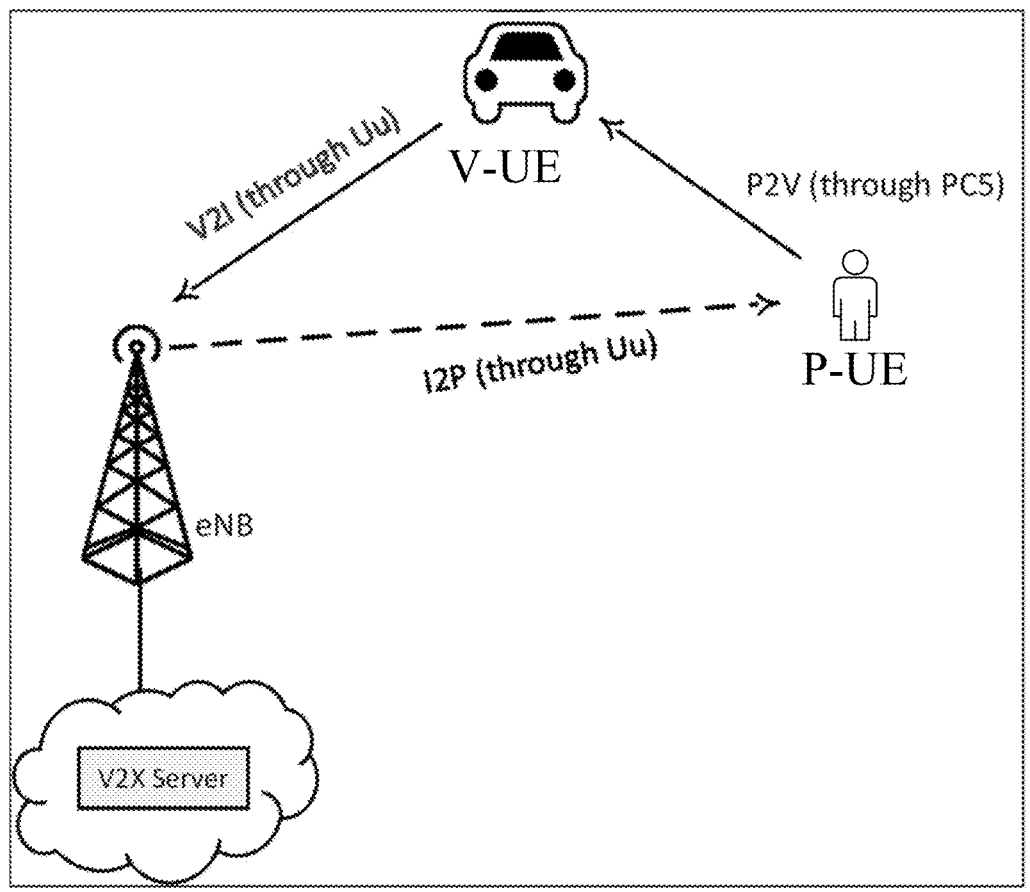
FIG. 9 illustrates an example vehicle to pedestrian system, in which aspects of the present disclosure may be practiced.

The techniques may be implemented in a vehicle to pedestrian (V2P) system, such as that shown in FIG. 9. The techniques presented herein may be considered a hybrid approach to reaching a pedestrian, in that it may employ a combination of interfaces, for example, an infrastructure to pedestrian (I2P) "Uu" radio interface between a pedestrian UE (P-UE), a vehicle to infrastructure (V2I) Uu radio interface between a vehicle UE (V-UE) and the radio access network, as well as a pedestrian to vehicle (P2V) sidelink interface (e.g., a PC5 interface) between the P-UE and V-UE. The Uu interface generally refers to the radio interface between the (various types of) UEs and the radio access network.

As will be described in greater detail below, the V-UE may provide assistance in warning a pedestrian (associated with the P-UE) of a potential collision by signaling a cloud-based vehicle to everything (V2X) server, prompting the V2X server to request the eNB page the P-UE as an alert of the potential collision.

One benefit of the approach presented herein is that it may shift some communication burden away from a P-UE to a V-UE, which may help the P-UE conserve power (e.g., by limiting how often it needs to monitor for sidelink communications from multiple vehicles/V-UEs). In some cases, P-UE sidelink communications may be limited to only those times when the P-UE is operating in a "pedestrian mode" such as when a user is walking, jogging, or biking. In other words, when a P-UE is in a vehicle, vehicle to pedestrian collisions may not be a concern as the V-UE of the vehicle may take over.

Another potential benefit of the approach presented herein is that it may leverage existing infrastructure, for example, avoiding significant changes to current standard specifications (that define the various radio interfaces).

Figure 10:
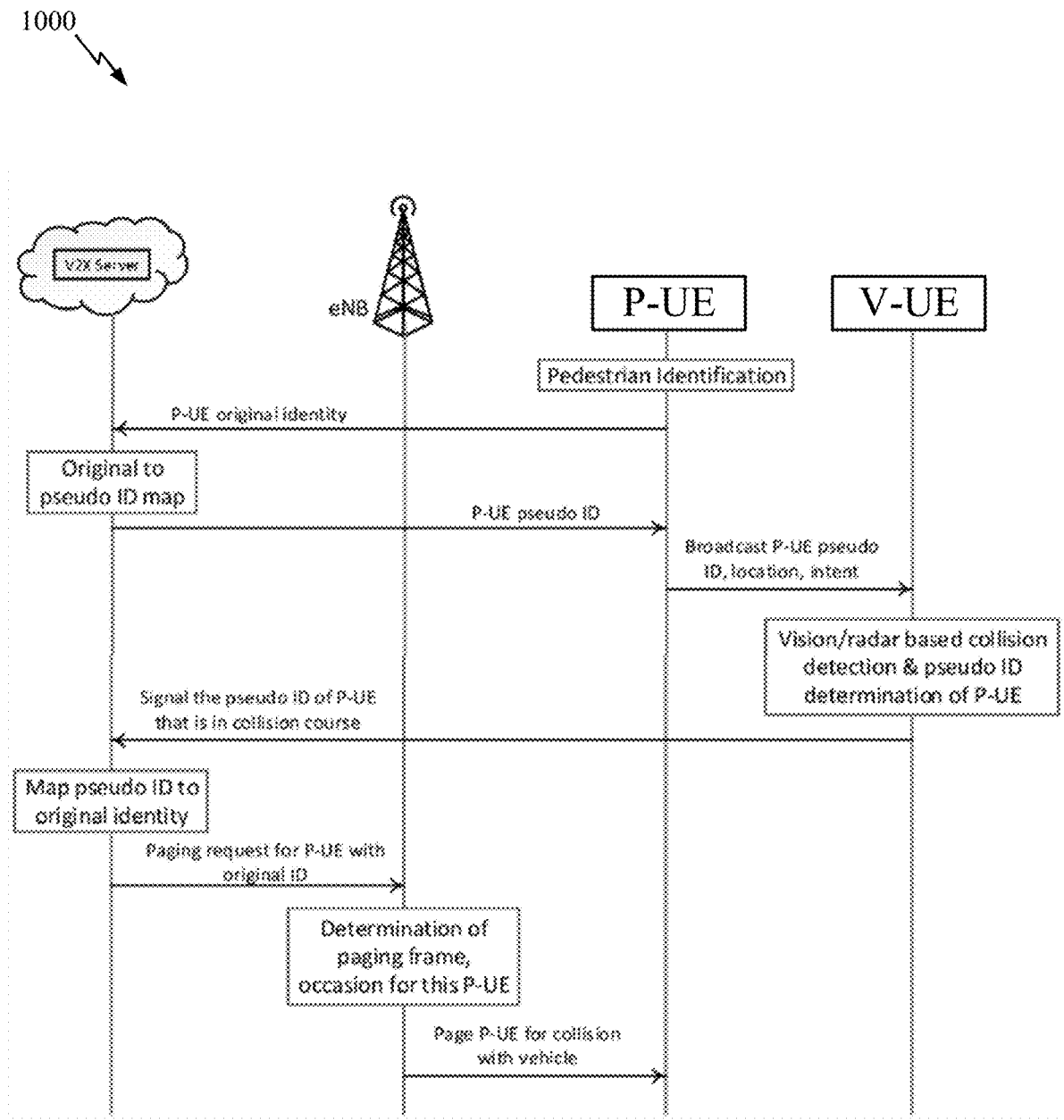
FIG. 10 is a call flow diagram illustrating an exchange of messages, in accordance with aspects of the present disclosure.

FIG. 10 is a call flow diagram 1000 illustrating an exchange of messages for a pedestrian warning procedure, in accordance with aspects of the present disclosure.

The procedure starts, with the P-UE identifying that the UE is in a mode associated with actions of a pedestrian. For example, the P-UE may determine a user's travel mode is one of interest, such as walking, running, or biking.

In some cases, to make this determination, the P-UE may utilize different sensors (e.g., sensors incorporated in the P-UE) to determine characteristics of pedestrian movement, such as pedestrian gait, speed, direction of movement, limb movement (e.g., arm or leg swing). In some cases, the P-UE may parameterize those characteristics and include those parameters in a broadcast message indicating pedestrian intent (as described further below). In some cases, the P-UE may also factor in location (e.g., if it is near a road and at risk of collision).

In any case, if the P-UE determines it is acting as a pedestrian (e.g., is performing in any of the modes of interest), the P-UE sends a request to a server (e.g., a cloud-based V2X application server) for the P-UE to be assigned a pseudo ID. The request may be sent via the eNB.

Use of the pseudo ID may help provide secrecy to the P-UE, as the P-UE does not wish to reveal its real identity. The V2X server may generate the pseudo ID by mapping the original ID (e.g., IMSI) of the P-UE to a pseudo ID. As illustrated, the V2X server may then provide the pseudo ID to the P-UE (e.g., sent via the eNB).

As illustrated, the P-UE may create and broadcast (to vehicles around it) a packet (e.g., an application packet) including the pseudo ID and various information that may help a V-UE detect a potential collision with the P-UE. For example, the packet may have the following content: Source ID to be set as its generated Pseudo ID, a Destination ID to be set to a broadcast ID, and various other information (e.g., GPS coordinates, parameterized characteristics that may indicate intent of the pedestrian).

As illustrated, the application packet may be provided to the V2X layers and below to be broadcasted via the P2V (PC5) interface to the V-UE (and/or other V-UEs in the vicinity).

While only one P-UE is shown in FIG. 10, in practice, the V-UE may receive the application packet containing the pseudo ID, location, and intent from several P-UEs. As illustrated, the V-UE determines whether any of these P-UEs are in a potential collision course with the V-UE, for example, based on vision/radar measurements, and the received application packet.

In some cases, the V-UE may using various information in the application packets (e.g., location/ID), to identify pedestrians and detect a possible collision (e.g., a certain pedestrian is at a certain location, traveling in a certain direction, and/or at a certain speed). In some cases, the V-UE may use information in the application packet (e.g., parameterized characteristics) to corroborate what it has identified as a particular P-UE.

If the V-UE detects a potential collision with one (or more) of the P-UEs, it may then take action to help inform them of the potential collision. For example, for V-UE may determine the pseudo ID for any of the P-UEs at risk and may signal (via a message forwarded by the eNB) the V2X server indicating the pseudo ID of P-UEs that it is in collision course with.

As illustrated, the V2X sever may (de-map) the pseudo ID of the P-UEs to their original UE-ID (e.g., IMSI, C-RNTI, etc.) and request the mobility management entity (MME)/eNB to page any such P-UEs (using the original IDs) for a potential collision warning.

Using the original ID of the P-UE provided by the V2X server, the eNB may calculate a next paging frame, and paging occasion for this P-UE so as to page the collision warning.

As illustrated, at this next paging occasion, the eNB may send out a paging message. In some cases, the paging message may include some indication of a potential imminent collision with a vehicle to the P-UE (irrespective of whether the P-UE is in RRC_IDLE or RRC_CONNECTED). In some cases, some type of audible stimulus or other stimulus (e.g., vibration and/or flashing) may also be used to enhance the possibility a pedestrian is alerted.

In some cases, some type of encoding format may be used to indicate vehicle collision, for example, in the paging control channel (PCCH) message used for the paging. Alternately or in addition, a separate field (e.g., 'vehicle collision' taking values TRUE or FALSE) can be signaled in the PCCH.

In some cases, an eNB may or may not support the vehicle collision system as described herein. In such cases, the eNB may provide an indication (e.g., advertise) of whether or not it provides such support. This information may allow a UE to save power (e.g., by not broadcasting this information if an eNB does not provide such support).

Figure 11:
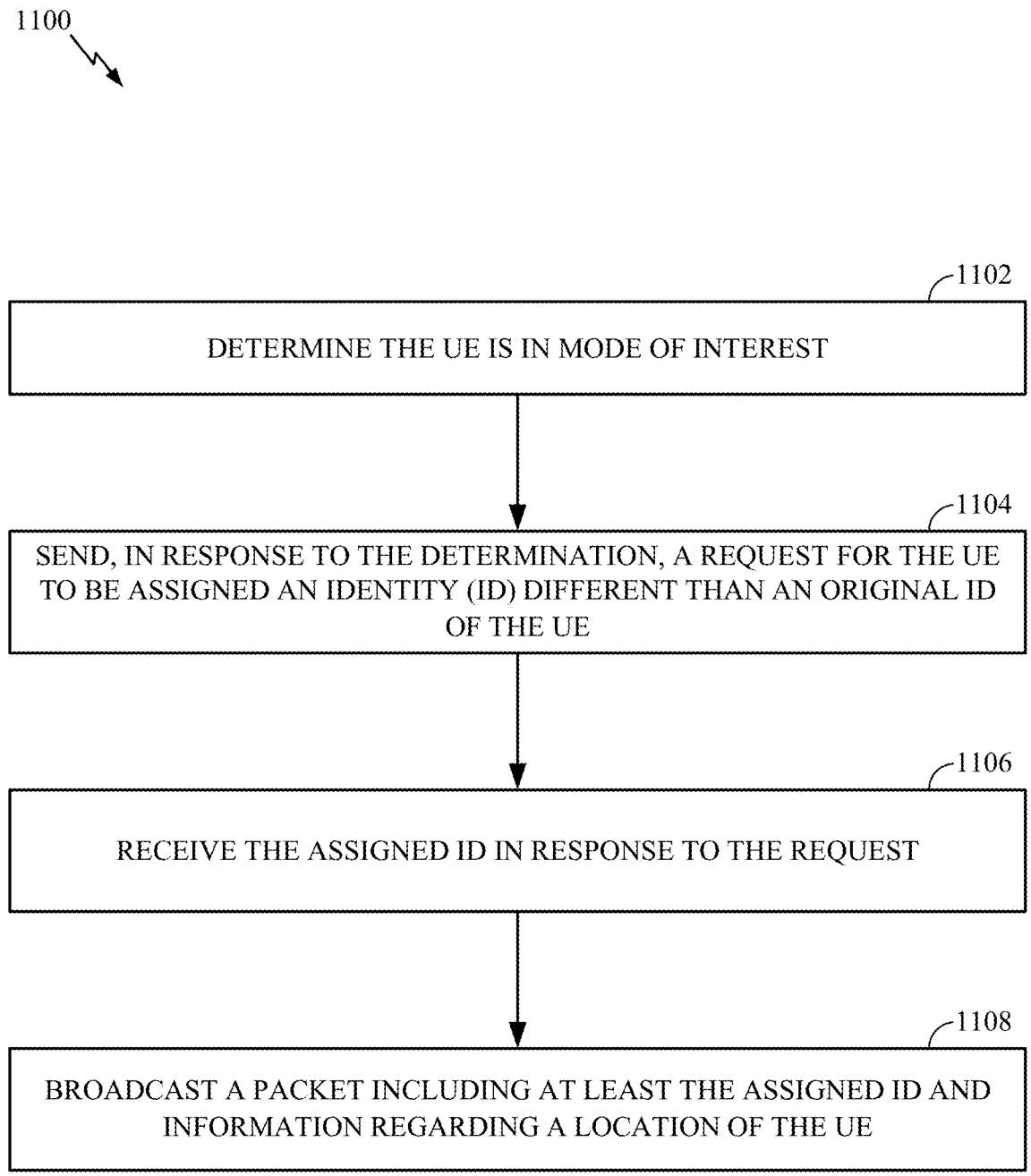
FIG. 11 illustrates example operations for wireless communications by a user equipment (UE), in accordance with certain aspects of the present disclosure.
Figure 12:
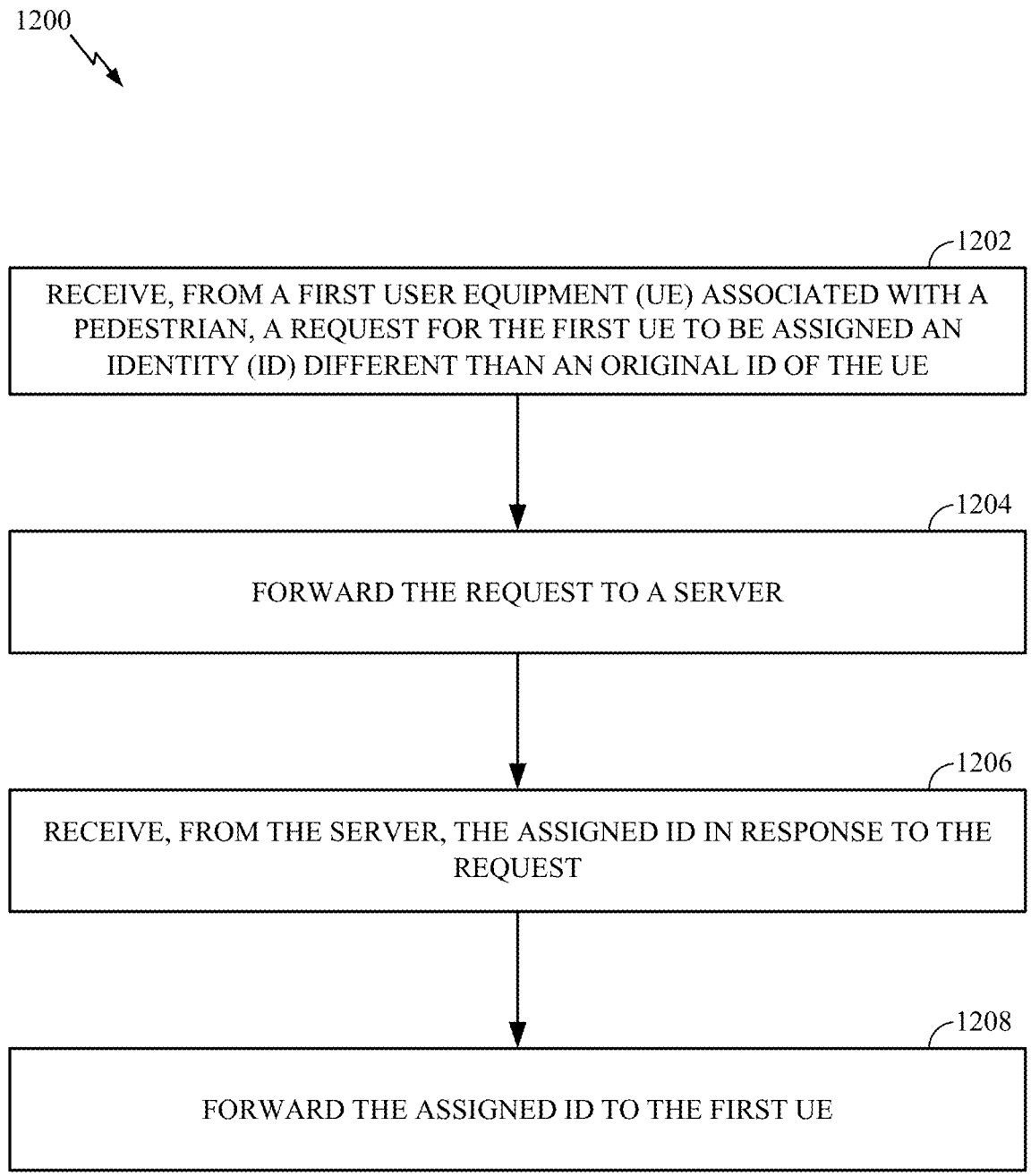
FIG. 12 illustrates example operations for wireless communications by a network entity, in accordance with certain aspects of the present disclosure.
Figure 13:
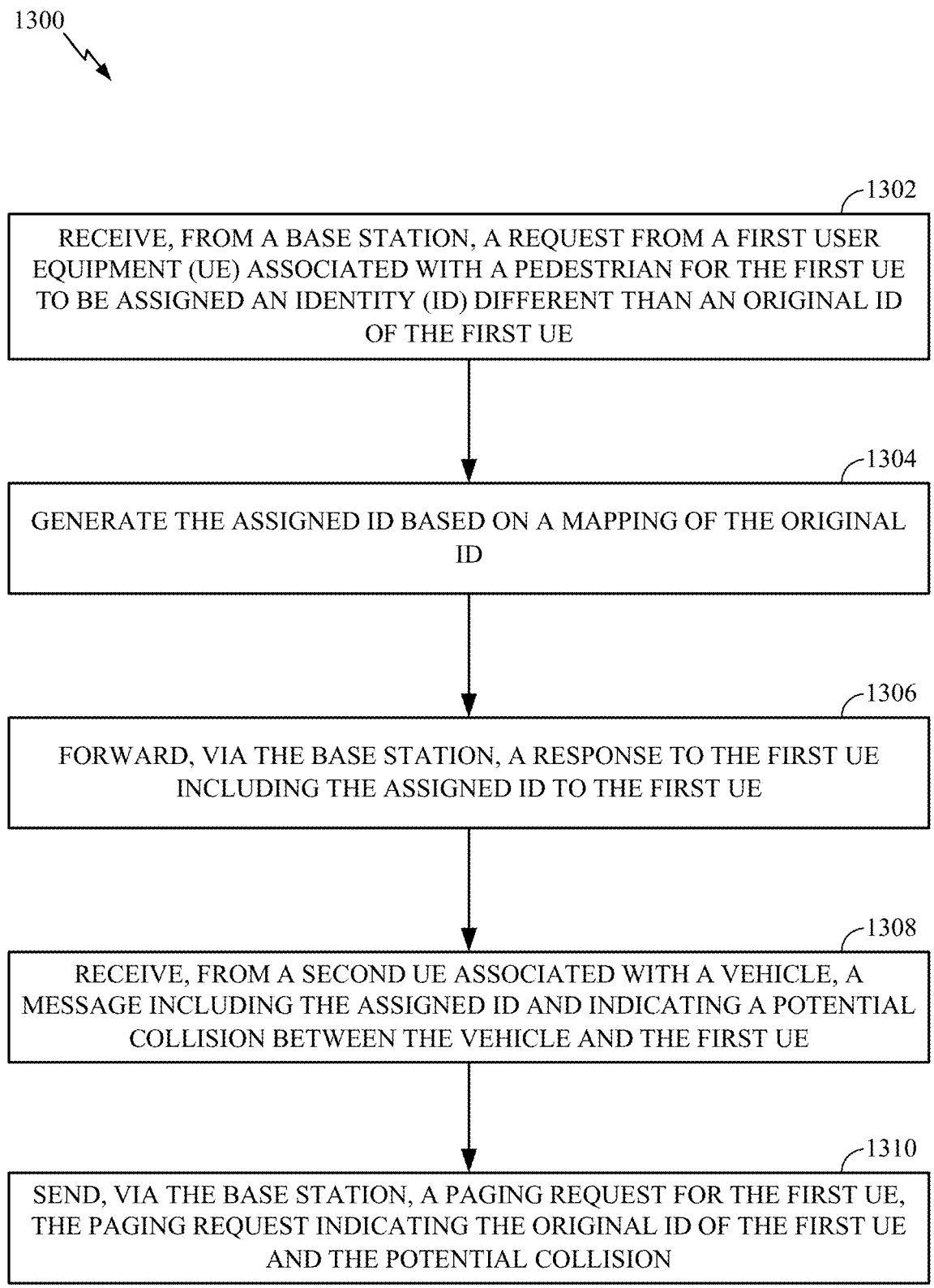
FIG. 13 illustrates example operations for wireless communications by a server, in accordance with certain aspects of the present disclosure.

FIGS. 11-13 separately illustrate example operations performed by the P-UE, the eNB, and the V2X server, respectively, in accordance with aspects of the present disclosure.

FIG. 11 illustrates example operations 1100 for wireless communications by a UE, in accordance with certain aspects of the present disclosure. For example, operations 1100 may be performed by the P-UE shown in FIGS. 9 and 10.

The operations 1100 begin, at block 1102, by determining the UE is in mode of interest. At 1104, the P-UE sends, in response to the determination, a request for the UE to be assigned an identity (ID) different than an original ID of the UE. At 1106, the P-UE receives the assigned ID in response to the request. At 1108, the P-UE broadcasts a packet including at least the assigned ID and information regarding a location of the UE.

FIG. 12 illustrates example operations for wireless communications by a network entity, in accordance with certain aspects of the present disclosure. For example, operations 1200 may be performed by the eNB shown in FIGS. 9 and 10.

The operations 1200 begin, at block 1202, by receiving, from a first UE associated with a pedestrian, a request for the first UE to be assigned an ID different than an original ID of the UE. At 1204, the eNB forwards the request to a server. At 1206, the eNB receives, from the server, the assigned ID in response to the request. At 1208, the eNB forwards the assigned ID to the first UE. According to aspects, communications between the first UE and the server in obtaining the assigned ID need not be transparent to the eNB (i.e., could happen at a non-3GPP higher layer).

FIG. 13 illustrates example operations for wireless communications by a server, in accordance with certain aspects of the present disclosure. For example, operations 1100 may be performed by the V2X server shown in FIGS. 9 and 10.

The operations 1300 begin, at block 1302, by receiving, from a base station, a request from a first UE associated with a pedestrian for the first UE to be assigned an ID different than an original ID of the first UE. At 1304, the server generates the assigned ID based on a mapping of the original ID. At 1306, the server forwards, via the base station, a response to the first UE including the assigned ID to the first UE. At 1308, the server receives, from a second UE associated with a vehicle, a message including the assigned ID and indicating a potential collision between the vehicle and the first UE. At 1310, the server sends, via the base station, a paging request for the first UE, the paging request indicating the original ID of the first UE and the potential collision.

As described above, the "hybrid" techniques presented herein may allow V-UEs to help alert a pedestrian of a potential collision. As such, the techniques presented herein may be part of an overall system that leverages existing wireless infrastructure to help improve driver and pedestrian safety.

Embodiment 1: An apparatus for wireless communications by a user equipment (UE), comprising: a memory; and a processor coupled with the memory, the memory and the processor configured to: determine the UE is in mode of interest; send, in response to the determination, a request for the UE to be assigned an identity (ID) different than an original ID of the UE; receive the assigned ID in response to the request; and broadcast a packet including at least the assigned ID and information regarding a location of the UE.

Example Embodiments

Embodiment 2: The apparatus of Embodiment 1, wherein the packet is broadcast via a pedestrian to vehicle (P2V) interface.

Embodiment 3: The apparatus of any of Embodiments 1, wherein the packet also includes parameters indicative of one or more characteristics of pedestrian movement associated with the UE.

Embodiment 4: The apparatus of Embodiment 3, wherein the one or more characteristics comprise at least one of: pedestrian gait, speed, direction of movement, or limb movement.

Embodiment 5: The apparatus of any of Embodiments 1-4, wherein the mode of interest comprises walking, running, or biking.

Embodiment 6: The apparatus of any of Embodiments 1-5, wherein: the request is sent to a cloud-based server via a base station; and the cloud-based server assigns the ID based on a mapping of the original ID.

Embodiment 7: The apparatus of Embodiment 6, wherein the memory and the processor are further configured to receive, from the base station, a message indicating a possible collision with a vehicle, wherein the message includes an indication of the original ID of the UE.

Embodiment 8: The apparatus of Embodiment 7, wherein the memory and the processor are further configured to receive, via a paging control channel (PCCH), an indication of a purpose of the message.

Embodiment 9: The apparatus of any of Embodiments 1-8, wherein the message indicates an event an related to a pedestrian to vehicle (P2V) interface.

Embodiment 10: An apparatus for wireless communications by a network entity, comprising: a memory; and a processor coupled with the memory, the memory and the processor configured to: receive, from a first user equipment (UE) associated with a pedestrian, a request for the first UE to be assigned an identity (ID) different than an original ID of the UE;

forward the request to a server; receive, from the server, the assigned ID in response to the request; and forward the assigned ID to the first UE.

Embodiment 11: The apparatus of Embodiment 10, wherein the memory and the processor are further configured to: receive, from a second UE associated with a vehicle, a message indicating the first UE is in a potential collision course with the vehicle; and forward the message to the server.

Embodiment 12: The apparatus of Embodiment 11, wherein the message includes the assigned ID.

Embodiment 13: The apparatus of Embodiment 12, wherein the memory and the processor are further configured to: receive, from the server, a paging request for the first UE; and send a paging message to the first UE in accordance with the paging request.

Embodiment 14: The apparatus of Embodiment 13, wherein the paging request indicates the original ID of the first UE.

Embodiment 15: The apparatus of Embodiment 14, wherein the paging message indicates the potential collision course.

Embodiment 16: The apparatus of any of Embodiments 13-15, wherein the memory and the processor are further configured to transmit the first UE, via a paging control channel (PCCH), an indication of a purpose of the paging message.

Embodiment 17: The apparatus of any of Embodiments 13-16, wherein the paging message indicates an event related to a pedestrian to vehicle (P2V) interface.

Embodiment 18: An apparatus for communications by a server, comprising: a memory; and a processor coupled with the memory, the memory and the processor configured to: receive, from a base station, a request from a first user equipment (UE) associated with a pedestrian for the first UE to be assigned an identity (ID) different than an original ID of the first UE; generate the assigned ID based on a mapping of the original ID; and forward, via the base station, a response to the first UE including the assigned ID to the first UE.

Embodiment 19: The apparatus of Embodiment 18, wherein the memory and the processor are further configured to: receive, from a second UE associated with a vehicle, a message including the assigned ID and indicating a potential collision between the vehicle and the first UE.

Embodiment 20: The apparatus of Embodiment 19, wherein the memory and the processor are further configured to: send, via the base station, a paging request for the first UE, the paging request indicating the original ID of the first UE and the potential collision.

Embodiment 21: A method for wireless communications by a user equipment (UE), comprising: determining the UE is in mode of interest; sending, in response to the determination, a request for the UE to be assigned an identity (ID) different than an original ID of the UE; receiving the assigned ID in response to the request; and broadcasting a packet including at least the assigned ID and information regarding a location of the UE.

Embodiment 22: The method of Embodiment 21, wherein the packet is broadcast via a pedestrian to vehicle (P2V) interface.

Embodiment 23: The method of any of Embodiments 21-22, wherein the packet also includes parameters indicative of one or more characteristics of pedestrian movement associated with the UE.

Embodiment 24: The method of Embodiment 23, wherein the one or more characteristics comprise at least one of: pedestrian gait, speed, direction of movement, or limb movement.

Embodiment 25: The method of any of Embodiments 21-24, wherein the mode of interest comprises walking, running, or biking.

Embodiment 26: The method of any of Embodiments 21-25, wherein: the request is sent to a cloud-based server via a base station; and the cloud-based server assigns the ID based on a mapping of the original ID.

Embodiment 27: The method of Embodiment 26, further comprising: receiving, from the base station, a message indicating a possible collision with a vehicle, wherein the message includes an indication of the original ID of the UE.

Embodiment 28: The method of Embodiment 27, further comprising: receiving, via a paging control channel (PCCH), an indication of a purpose of the message.

Embodiment 29: The method of any of Embodiments 27-28, wherein the message indicates an event an related to a pedestrian to vehicle (P2V) interface.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. For example, various processors shown in FIG. 4 may be configured to perform operations described herein and illustrated in FIGS. 11, 12, and/or 13.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein and illustrated in FIGS. 11, 12, and/or 13.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. An apparatus for wireless communications at a user equipment (UE), comprising:
a memory comprising instructions; and
one or more processors, individually or collectively, configured to execute the instructions and cause the apparatus to:
determine the UE is in a mode of interest indicative of a type of pedestrian motion of the UE;
send, in response to the determination that the UE is in the mode of interest comprising walking, running, or biking, a request for the UE to be assigned an identity (ID) different than an original ID of the UE;
receive an assigned ID in response to the request;
broadcast a packet including at least the assigned ID and information regarding a location of the UE; and
receive, from a base station, a paging message indicating a possible collision with a vehicle, wherein the paging message comprises an indication of the original ID of the UE that is different from the assigned ID.

2. The apparatus of claim 1, wherein the packet is broadcast via a pedestrian to vehicle (P2V) interface.

3. The apparatus of claim 1, wherein:
the UE comprises a pedestrian UE (P-UE); and
the one or more processors, individually or collectively, are configured to execute the instructions and cause the apparatus to use the assigned ID for pedestrian to vehicle (P2V) communications.

4. The apparatus of claim 1, wherein the packet also includes parameters indicative of one or more characteristics of pedestrian movement associated with the UE.

5. The apparatus of claim 4, wherein the one or more characteristics comprise at least one of: pedestrian gait, speed, direction of movement, or limb movement.

6. The apparatus of claim 1, wherein:
the request is sent to a cloud-based server via the base station; and
the cloud-based server assigns the ID based on a mapping of the original ID.

7. The apparatus of claim 1, wherein the one or more processors, individually or collectively, are configured to execute the instructions and cause the apparatus to receive, via a paging control channel (PCCH), an indication of a purpose of the paging message.

8. The apparatus of claim 1, wherein the paging message indicates an event related to a pedestrian and the vehicle.

9. An apparatus for wireless communications by at a network entity, comprising:
a memory comprising instructions; and
one or more processors, individually or collectively, configured to execute the instructions and cause the apparatus to:
receive, from a first user equipment (UE) associated with a pedestrian, a request for the first UE to be assigned an identity (ID) different than an original ID of the first UE;
forward the request to a server;
receive, from the server, an assigned ID in response to the request;
forward the assigned ID to the first UE;
receive, from a second UE associated with a vehicle, a message indicating the first UE is in a potential collision course with the vehicle, wherein the message includes the assigned ID;
forward the message to the server;
determine a next paging occasion for the first UE, to send a paging message indicating the potential collision course, based on a paging request from the server, wherein the paging request indicates the original ID of the first UE that is different from the assigned ID received from the server; and
send the paging message in the next paging occasion to the first UE irrespective of whether the first UE is in an idle mode or a connected mode.

10. The apparatus of claim 9, wherein the one or more processors, individually or collectively, are configured to execute the instructions and cause the apparatus to:
receive, from the server, the paging request for the first UE, in response to the message.

11. The apparatus of claim 9, wherein the paging message comprises an audible alert indicating the potential collision course.

12. The apparatus of claim 9, wherein the one or more processors, individually or collectively, are configured to execute the instructions and cause the apparatus to transmit to the first UE, via a paging control channel (PCCH), an indication of a purpose of the paging message.

13. The apparatus of claim 9, wherein the paging message indicates an event related to a pedestrian and the vehicle.

14. A method for wireless communications by a user equipment (UE), comprising:
- determining the UE is in a mode of interest indicative of a type of pedestrian motion of the UE;
- sending, in response to the determination that the UE is in the mode of interest comprising walking, running, or biking, a request for the UE to be assigned an identity (ID) different than an original ID of the UE;
- receiving an assigned ID in response to the request;
- broadcasting a packet including at least the assigned ID and information regarding a location of the UE; and
- receiving, from a base station, a paging message indicating a possible collision with a vehicle, wherein the paging message comprises an indication of the original ID of the UE that is different from the assigned ID.

15. The method of claim 14, wherein the packet is broadcast via a pedestrian to vehicle (P2V) interface.

16. The method of claim 14, wherein the packet also includes parameters indicative of one or more characteristics of pedestrian movement associated with the UE.

17. The method of claim 16, wherein the one or more characteristics comprise at least one of: pedestrian gait, speed, direction of movement, or limb movement.

18. The method of claim 14, wherein:
- the request is sent to a cloud-based server via the base station; and
- the cloud-based server assigns the ID based on a mapping of the original ID.

19. The method of claim 18, further comprising:
- receiving, via a paging control channel (PCCH), an indication of a purpose of the paging message.

20. The method of claim 18, wherein the paging message indicates an event related to a pedestrian and the vehicle.

* * * * *